(12) United States Patent
Boyle

(10) Patent No.: US 7,797,526 B2
(45) Date of Patent: Sep. 14, 2010

(54) SERVICE PROCESSOR HOST FLASH UPDATE OVER LPC

(75) Inventor: Patrick D. Boyle, Los Altos, CA (US)

(73) Assignee: Oracle America, Inc., Redwood City, CA (US)

( * ) Notice: Subject to any disclaimer, the term of this patent is extended or adjusted under 35 U.S.C. 154(b) by 1133 days.

(21) Appl. No.: 11/449,951

(22) Filed: Jun. 8, 2006

(65) Prior Publication Data

US 2007/0288737 A1     Dec. 13, 2007

(51) Int. Cl.
*G06F 9/00* (2006.01)
(52) U.S. Cl. .............................. 713/2; 713/1
(58) Field of Classification Search .............. 713/1, 713/2
See application file for complete search history.

(56) References Cited

U.S. PATENT DOCUMENTS

| 6,185,696 | B1* | 2/2001 | Noll ............................... 714/6 |
| 7,149,837 | B2* | 12/2006 | Watts et al. .................. 710/303 |
| 2003/0018925 | A1* | 1/2003 | Mohammad ................ 713/600 |
| 2004/0243798 | A1* | 12/2004 | Goud et al. .................. 713/100 |
| 2006/0212694 | A1* | 9/2006 | Koizumi ........................ 713/2 |

\* cited by examiner

*Primary Examiner*—Tse Chen
(74) *Attorney, Agent, or Firm*—Osha • Liang LLP

(57) ABSTRACT

A method for updating the contents of a BIOS ROM includes disconnecting a host system from the BIOS ROM, transferring data from a service processor to the BIOS ROM, and updating the contents of the BIOS ROM using the transferred data. A BIOS update system for a computer system, includes a BIOS ROM containing BIOS instructions, a service processor that contains update data for the contents of the BIOS ROM, an LPC bus that transfers the update data from the service processor to the BIOS ROM, and quick switches that disconnect a host system from the LPC bus.

7 Claims, 3 Drawing Sheets

SERVICE PROCESSOR HOST FLASH UPDATE OVER LPC

BACKGROUND

The Basic Input/Output System, or BIOS, is basic low-level software for configuring a computer system. The BIOS is run by a computer when it first powers on and stored on hardware known as a BIOS ROM. BIOS ROM contents include the BIOS, configuration settings such as boot order and passwords, and BIOS logs. Part of the BIOS is executable x86 code, and part of it is compressed and requires decompression into memory before execution. In the process known as "booting up," the BIOS prepares the machine so that other software programs stored on various media, such as hard drives, floppies, and CDs, can load, execute, and assume control of the computer. Other tasks that the BIOS performs include a power-on self-test to ensure that different hardware components in the system are working properly, executing the BIOS expansion ROM code on different cards installed on the computer, and providing a set of low-level routines that the operating system uses to interface with different hardware devices.

In older machines, BIOSes were held on ROM chips that could not be altered. As their complexity and need for updates grew, BIOSes were moved to EEPROM or flash memory that could be easily upgraded by the user. BIOS updates are necessary for fixing bugs, accommodating new devices and standards, improving performance and stability, and changing BIOS settings.

Traditionally, updating the contents of a BIOS ROM involved several steps that must be physically performed by a person at the machine. First, a system disk must be created by populating a floppy drive with system files. Next, the BIOS must be copied to the floppy disk. The machine must then be rebooted with the floppy disk in the floppy drive. The computer will boot off the floppy disk, and the user is then allowed to update the BIOS from the floppy disk. All steps in updating the BIOS are channeled through the machine's CPU.

Alternately, the BIOS may be updated by running a program on the machine's operating system. This may be accomplished by a user present at the machine, a remote user, or a scheduled process. While this BIOS update method is more convenient than the floppy disk method, the update process is still performed through the CPU.

While performing a BIOS update is relatively quick for a PC user, data centers typically employ thousands of servers. This makes the floppy-based BIOS update method impractical, as an administrator would have to manually perform the update to every machine on the network. In addition, both the floppy-based and operating system-based update methods require the machine to boot properly and do not work if the BIOS flash is corrupted. BIOS recovery processes exist to handle a corrupted BIOS flash, but also require manual intervention similar to the floppy disk-based update process. Furthermore, if the CPU of the system is down, there is no way to update the BIOS using the two methods described above. As a result, an optimal BIOS update method would allow BIOSes on multiple machines over a network to be updated at the same time without using the CPU or taking down the machine.

SUMMARY

In accordance with one or more embodiments of the present invention, a method for updating the contents of a BIOS ROM comprises electrically disconnecting a host system from the BIOS ROM; transferring data from a service processor to the BIOS ROM; and updating the BIOS ROM contents using the transferred data.

In accordance with one or more embodiments of the present invention, a BIOS update system for a computer system comprises a BIOS ROM containing BIOS instructions; a service processor that contains update data for the BIOS ROM; an LPC bus that transfers the update data from the service processor to the BIOS ROM; and quick switches that disconnect a host system from the LPC bus.

Other aspects and advantages of the invention will be apparent from the following description and the appended claims.

DETAILED DESCRIPTION

Figure 1:
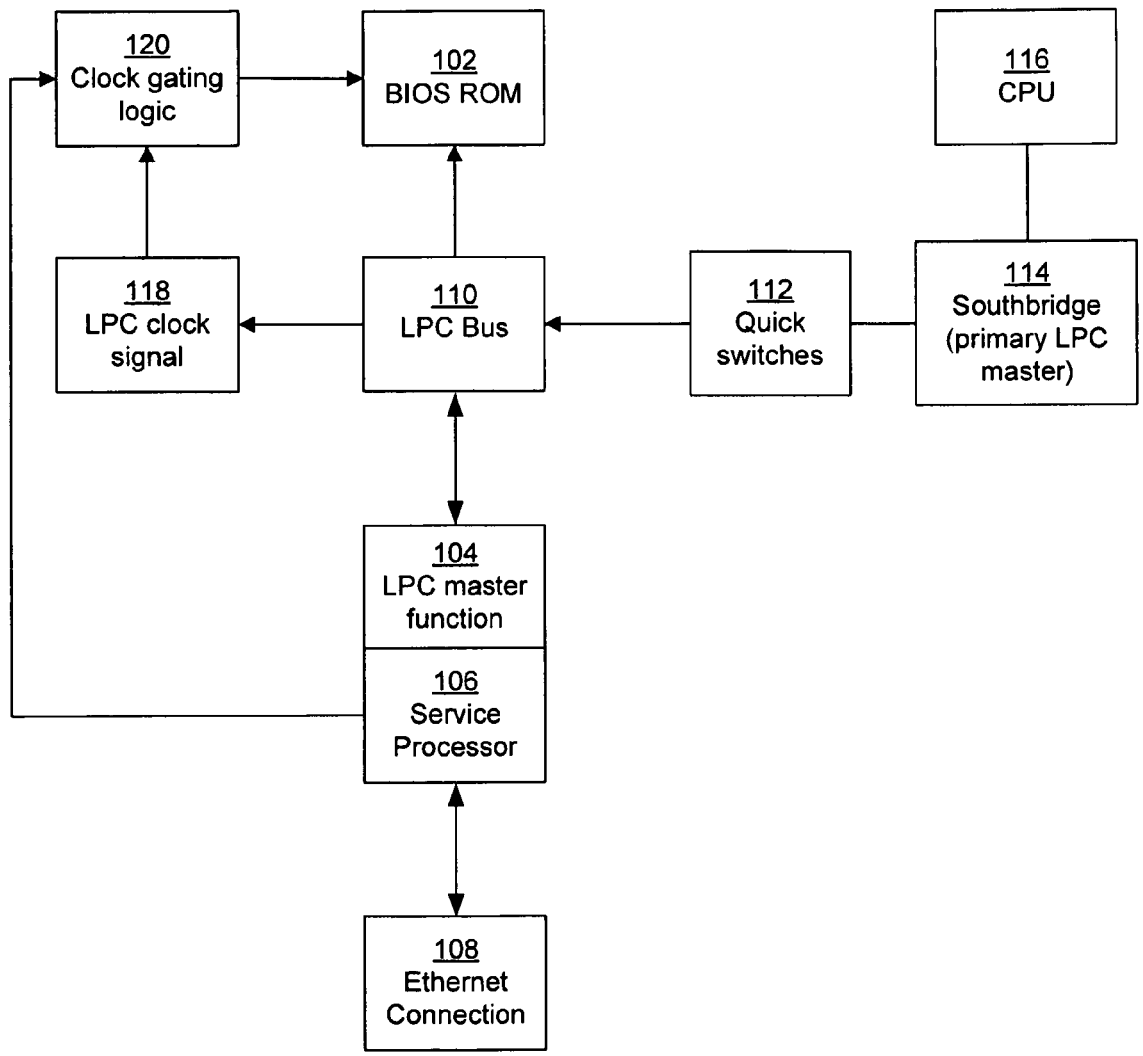
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to update the contents of a BIOS ROM via a service processor. Specifically, one or more embodiments of the invention relate to a method and apparatus for disconnecting the host system from the LPC bus, mastering the LPC bus using the service processor, and updating the BIOS from the service processor via the LPC bus. Embodiments enable the BIOS to be updated using a method that does not require the physical presence of the user or taking down of the system.

FIG. 1 shows a schematic diagram of a system in accordance with one or more embodiments of the invention. As shown in FIG. 1, the system includes a BIOS ROM (102), an LPC master function (104), a service processor (106), an Ethernet connection (108), an LPC bus (110), one or more quick switches (112), a Southbridge (114), a CPU (116), an LPC clock signal (118), and clock gating logic (120). A typical BIOS update is directed from the CPU (116) to the Southbridge (114), then loaded onto the BIOS ROM (102) from the Southbridge (114) through the LPC bus (110). Unlike the PCI standard, the LPC bus (110) does not implement peer-to-peer direct memory access, or DMA. As a result, an LPC device can master the LPC bus but cannot transfer data to or from other devices on the LPC bus.

Embodiments of the invention utilize the service processor (106) instead of the CPU (116) to update the BIOS software residing in the BIOS ROM (102). In one or more embodiments of the invention, the BIOS ROM (102) is located on a socket on the motherboard and consists of a rewritable EPROM or EEPROM chip. Those skilled in the art will appreciate that the BIOS ROM (102) may refer to BIOS chips residing on other cards installed on the machine, the BIOS ROM (102) may not reside in a socket on the motherboard, and that the BIOS ROM (102) may include other types of memory.

In one or more embodiments of the invention, the service processor (106) contains the BIOS update that will be channeled to the BIOS ROM (102). The service processor (106) runs independently of the CPU (116) and other processors in the system, uses its own firmware and has the ability to use a separate power supply. The service processor (106) provides a variety of services depending on the system, including remote power on/off/reset, Telnet consoles, web browser environments, and remote management of the machine independently of the operating system.

The service processor (106) is often accessed remotely via an Ethernet connection (108). In one or more embodiments of the invention, the Ethernet connection (108) provides the BIOS update to the service processor (106). In one or more embodiments of the invention, the service processor (106) is updated first via the Ethernet connection (108), then the BIOS ROM (102) is updated from the service processor (106) using an update also obtained from the Ethernet connection (108).

The Southbridge (114) chip is the primary bus master of the LPC bus (110). In conventional systems, the Southbridge (114) is responsible for updating the BIOS ROM (102) and is connected to the CPU (116) through one or more Northbridges (not shown). The LPC bus (110) connects the Southbridge (114) to various slave devices, including the BIOS ROM (102) and the service processor (106).

Because embodiments of the invention relate to a method and apparatus for updating the BIOS ROM (102) with the service processor (106), the service processor (106) must implement master functionality of the LPC bus (110) in order to transfer the BIOS update to the BIOS ROM (102). In addition, since the LPC bus (110) does not support peer-to-peer DMA, the Southbridge (114) must be also be disconnected from the LPC bus (110).

To disconnect the Southbridge (114) from the LPC bus (110), one or more quick switches (112) are utilized. The quick switches (112) serve to electrically isolate the host system, which includes the CPU (116) and the Southbridge (114), from the LPC bus (110). Furthermore, in one or more embodiments of the invention, the CPU (116) may be held in reset or turned off while the host system is electrically disconnected from the LPC bus (110). One or more embodiments of the invention may utilize FET switches as the quick switches (112). Those skilled in the art will appreciate that other methods and components may be used to disconnect the Southbridge (114) from the LPC bus (110).

The LPC bus (110) transmits an LPC clock signal (118) to the BIOS ROM (102). The LPC clock signal (118) is used to coordinate the actions of various devices connected to the LPC bus (110). The service processor (106) controls the clock gating logic (120), which is connected in series to the LPC clock signal (118) that is transmitted to the BIOS ROM (102). The service processor (106) can use the clock gating logic (120) to stop the transmission of the LPC clock signal (118) to the BIOS ROM (102) in preparation for an update of the BIOS ROM (102). Stopping the LPC clock signal (118) to the BIOS ROM (102) as well as disconnecting the Southbridge (114) from the LPC bus (110) allows the contents of the BIOS ROM (102) to be updated without disruption. One skilled in the art will appreciate that other methods and components may be used to stop the transmission of the LPC clock signal (118) to the BIOS ROM (102).

The LPC master function (104) allows the service processor (106) to become bus master of the LPC bus (110). Once the Southbridge (114) is disconnected from the LPC bus (110), the service processor (106) can assume control of the LPC bus (110) with the LPC master function (104). The LPC master function (104) may be implemented using various means. For example, the LPC master function (104) may reside on an FPGA, or it may be integrated into the service processor (106) circuitry. In one or more embodiments of the invention, the LPC master function (104) used by the service processor (106) is the same LPC master function found in the Southbridge (114). When the LPC bus (110) has been mastered by the service processor (106), the service processor (106) can proceed to update the BIOS ROM (102) through the LPC bus (110).

Figure 2:
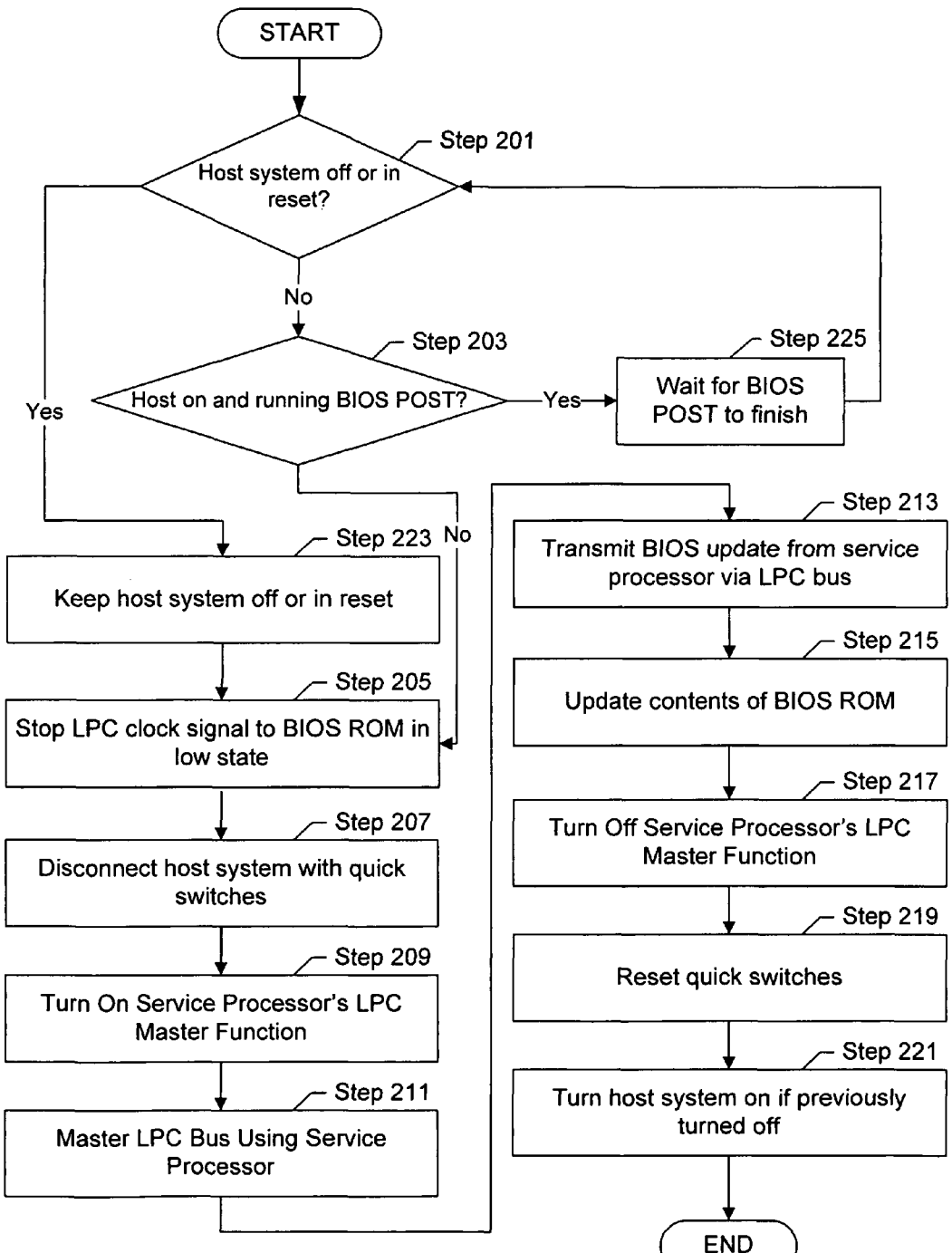
FIG. 2 shows a flow diagram of a method in accordance with one or more embodiments of the invention.

FIG. 2 shows a flow diagram of a method in accordance with one or more embodiments of the invention. Specifically, FIG. 2 shows a method for updating a BIOS using a service processor in accordance with one or more embodiments of the invention.

First, a check is made to determine if the host system is off or in reset (Step 201). If the system is off or in reset, the host system is held off or in reset until the BIOS ROM update is finished (Step 223). Otherwise, if the host system is on, a check is made to determine whether a BIOS power on self test, or POST, is taking place (Step 203). If so, the service processor must wait for the BIOS POST to complete before proceeding (Step 225). If after the BIOS POST, the host system is held in reset or turned off (Step 201), the service processor keeps the host system off or in reset (Step 223) until the BIOS ROM update is finished. In one or more embodiments of the invention, the service processor places the host system in reset or turns the host system off after the BIOS POST. In one or more embodiments of the invention, if the host system is on but not in BIOS POST the service processor may turn the host system off or keep the host system in reset before proceeding with the rest of the BIOS ROM update process.

Once the host system has reached a suitable state (off, in reset, or on and not in BIOS POST), the service processor stops the LPC clock signal to the BIOS ROM in a low state (Step 205) using the clock gating logic shown in FIG. 1, preparing the BIOS ROM for an update. Next, the host system is disconnected from the LPC bus using quick switches (Step 207). Once the primary LPC bus master has been removed, the service processor's LPC master function is turned on (Step 209). This allows the service processor to master the LPC bus (Step 211) and transmit the BIOS update from the service processor via the LPC bus (Step 213). The BIOS update is received by the BIOS ROM, an LPC slave, and the contents of the BIOS ROM are updated (Step 215).

Once the BIOS is updated, the system begins the process of restoring default settings. The service processor's LPC master function is turned off (Step 217), thus relinquishing control of the LPC bus by the service processor. The host system is reconnected by resetting the quick switches (Step 219), and the host system is turned on (Step 221) if it was held off. In one or more embodiments of the invention, the host system may be turned on first, then reconnected.

Figure 3:
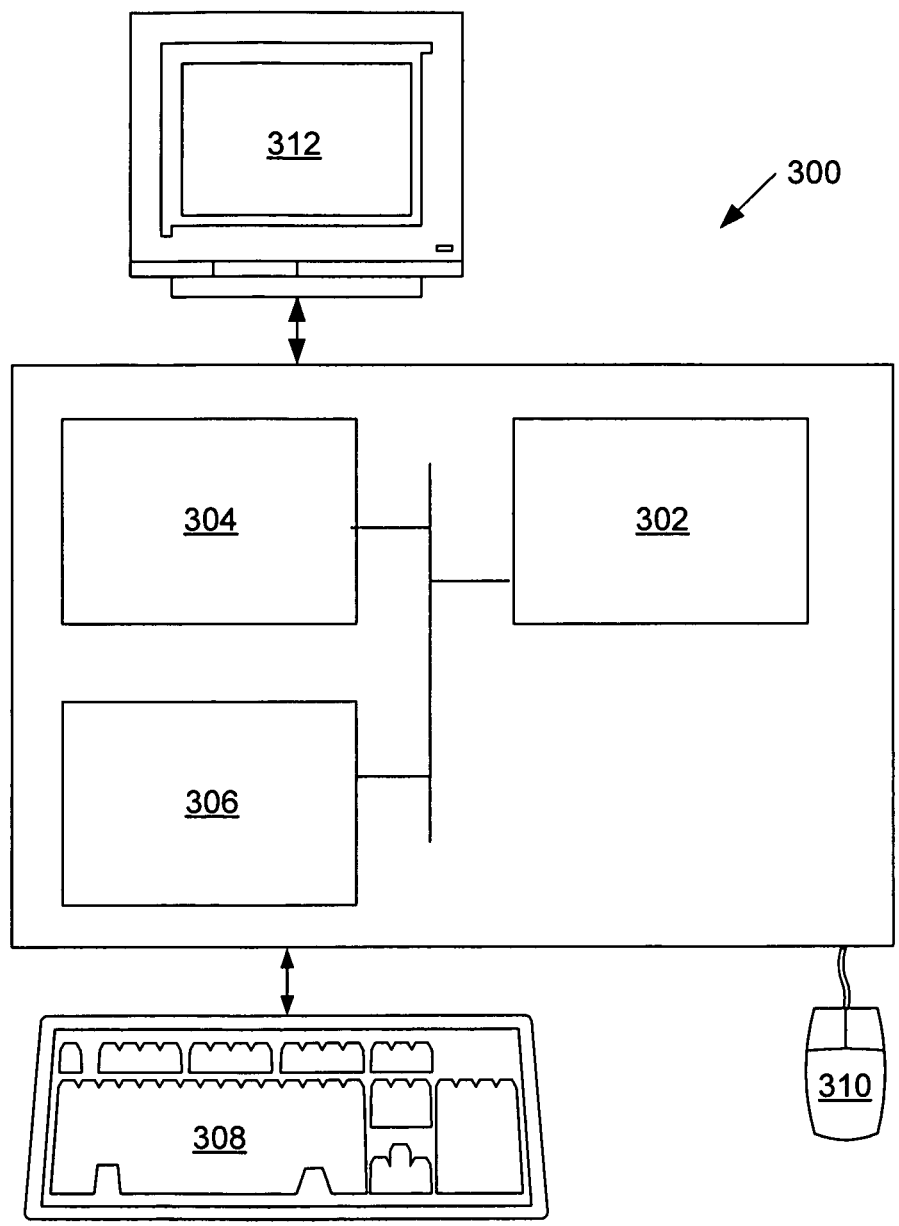
FIG. 3 shows a computer system in accordance with one or more embodiments of the invention.

The invention may be implemented on virtually any type of computer regardless of the platform being used. For example, as shown in FIG. 3, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g. BIOS, service processor, CPU, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for updating contents of a BIOS ROM comprising:
   disconnecting a host system from the BIOS ROM;
   disconnecting the Southbridge from the LPC bus;
   mastering the LPC bus with the service processor;
   transferring data from a service processor to the BIOS ROM;
   using an LPC bus to transfer data from the service processor to the BIOS ROM; and
   updating the contents of the BIOS ROM using the transferred data,
   wherein control of the LPC bus is switched from the Southbridge to the service processor,
   wherein mastering of the LPC bus by the service processor comprises incorporating an LPC master function in a Southbridge into the service processor, and
   wherein the LPC master function is integrated into the Southbridge circuitry.

2. The method of claim 1, further comprising holding a host system in reset while updating the contents of the BIOS ROM.

3. The method of claim 1, further comprising turning off a host system prior to updating the contents of the BIOS ROM.

4. The method of claim 1, wherein the LPC master function for the service processor is accomplished using an FPGA.

5. The method of claim 1, further comprising disconnecting the Southbridge from the LPC bus using a plurality of quick switches.

6. The method of claim 1, further comprising:
   updating the service processor via an Ethernet connection; and
   transmitting update data from the updated service processor to the BIOS ROM.

7. The method of claim 1, further comprising using a clock gating logic to stop an LPC clock signal from the LPC bus to the BIOS ROM.

* * * * *